H. D. TAYLOR.
RANGE FINDING AND THE LIKE INSTRUMENT.
APPLICATION FILED AUG. 19, 1918.
1,339,235.
Patented May 4, 1920.
3 SHEETS—SHEET 1.
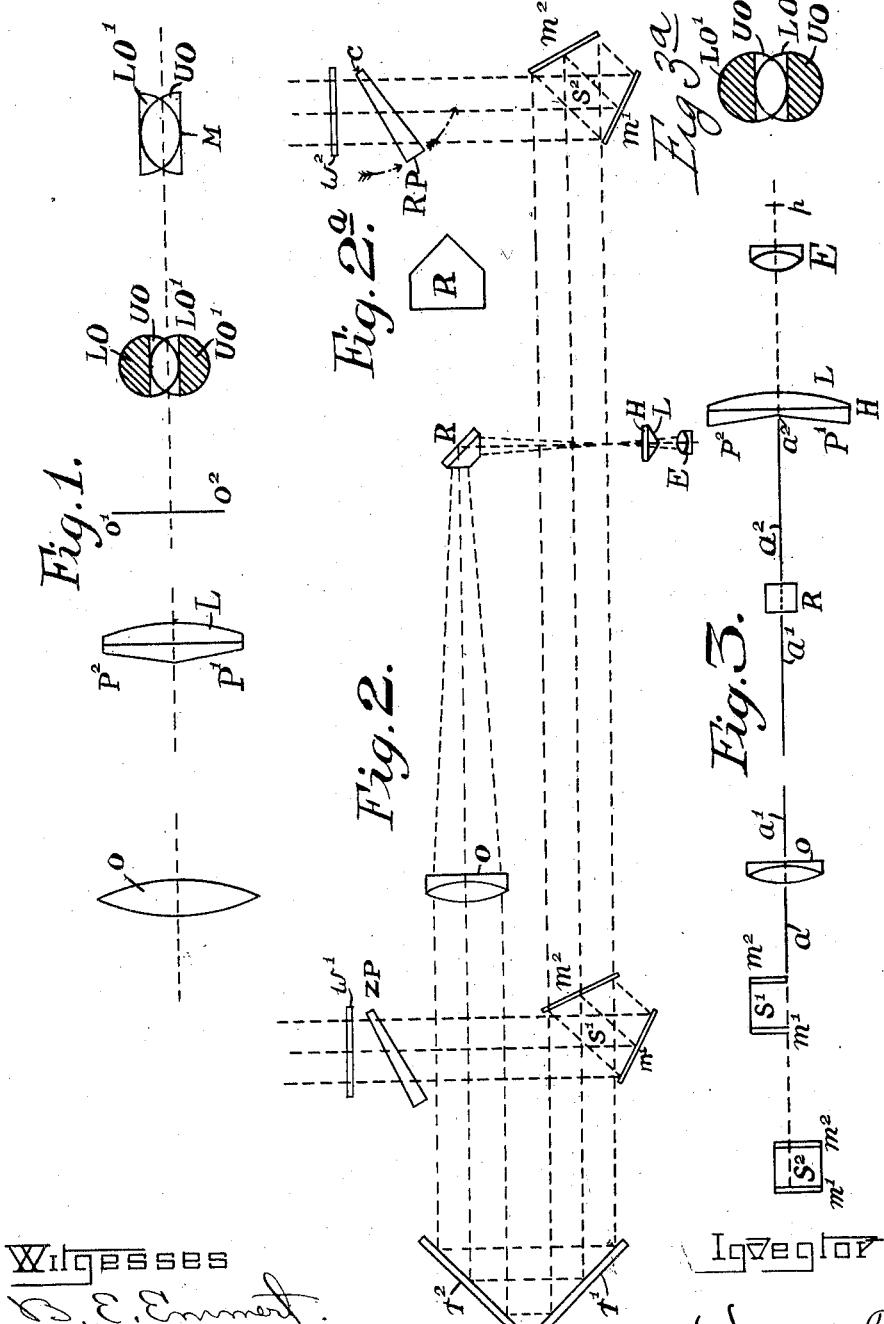

H. D. TAYLOR.
RANGE FINDING AND THE LIKE INSTRUMENT.
APPLICATION FILED AUG. 19, 1918.
1,339,235.
Patented May 4, 1920.
3 SHEETS—SHEET 3.
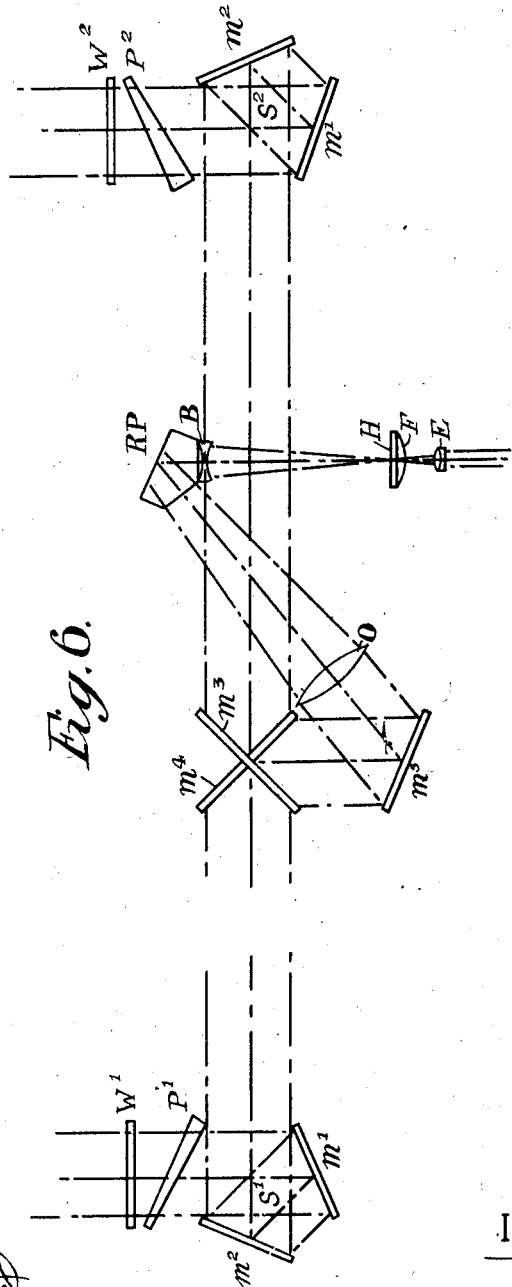

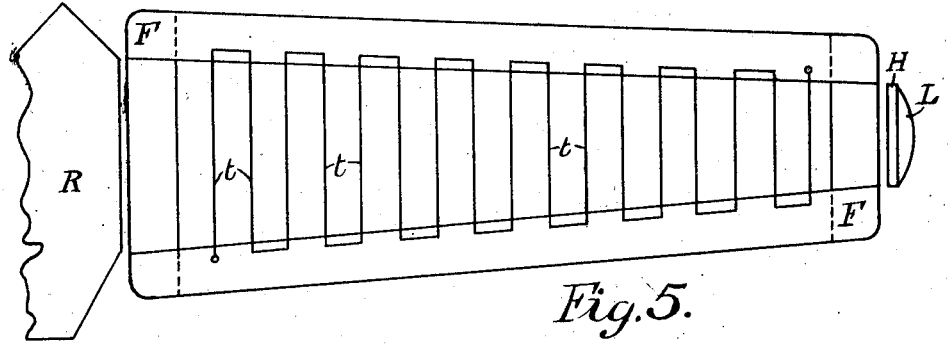
Fig. 5.
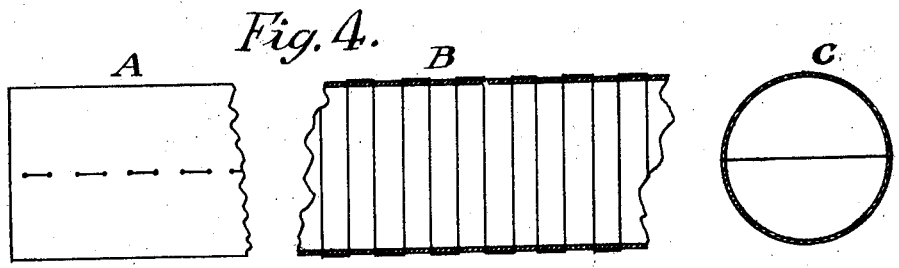
Fig. 4.
Fig. 7.
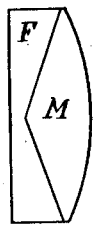
Fig. 8.
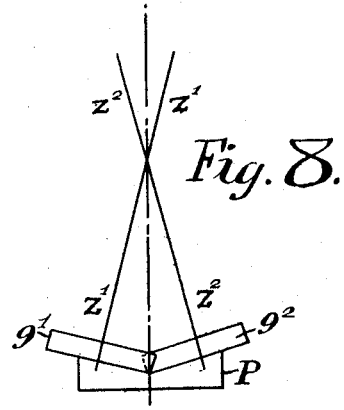

UNITED STATES PATENT OFFICE.

HAROLD DENNIS TAYLOR, OF YORK, ENGLAND.

RANGE-FINDING AND THE LIKE INSTRUMENT.

1,339,235.   Specification of Letters Patent.   Patented May 4, 1920.

Application filed August 19, 1918. Serial No. 250,575.

*To all whom it may concern:*

Be it known that I, HAROLD DENNIS TAYLOR, subject of the King of Great Britain, residing at York, in the county of York and Kingdom of England, have invented certain new and useful Improvements in and Relating to Range-Finding and the like Instruments, of which the following is a specification.

The present invention relates to improvements in range finding and like instruments for ascertaining distances.

By this invention a split image field of view is obtained as applied to a range finder or the like instrument where a pair of lines of sight emerge from the instrument or its parts at a certain predetermined distance apart, that is to say more generally speaking to a range finder of the "home base" type, so that the illumination of one half of the field of view of said instrument is constrained to illumination from one half of the object glass and one end of the base line while the illumination of the other half field of view is constrained to illumination from the other half of the object glass and the other end of the "home base" line.

Figure 1. is a partial diagrammatic elevation of the eye piece end of a range finder.

Fig. 2. is a diagrammatic plan view of a complete range finder.

Fig. 2$^a$, is a side view of a reversing prism.

Fig. 3. is a corresponding vertical diagrammatic section of Fig. 2.

Fig. 3$^a$. shows the formation of images behind the eye-piece.

Figs. 4 and 5, are views showing screens adjacent the eye piece end of the range finder telescope.

Fig. 6 is a diagrammatic plan view showing a modified form of range finder.

Fig. 7. is a detail showing a modified construction of separating prism.

Fig. 8 is a diagrammatic view showing one method of forming a separating prism.

A range finder having what is known as a split image field of view, that is where the circular apparent field of view is divided by a sharp line into two halves, one half, usually the upper half, being formed by light solely from one end of the instrument and the other half by light solely from the other end of the instrument, was described in H. Dennis Taylor's patent specifications Nos. 12735 of 1904 and 7322 of 1907. This was brought about by the use of what I call a male separating and halving prism like $P^1$, $P^2$ in Fig. 1 of the diagrams accompanying this specification. The objective O forms an image of the distant objects viewed in the plane containing the ridge of the halving prism $P^1$ $P^2$ and in the type of range finder to which my invention more especially applies, the upper half of the objective receives light from the left hand window of the instrument while the lower half receives light from the right hand window of the instrument or vice versa, while each half of the objective throws light and forms an image of distant objects over the whole of the halving prism $P^1$ $P^2$. The object of the separating and halving prism is to sort out or separate the two super-imposed images. To this end the halving prism is attached to a halving lens L, simple or achromatic, which is really the first lens of a four lens erecting eyepiece.

The joint effect of the said lens together with the halving or separating prism is to project two half overlapping images of the objective in the air as at $O_1$—$O_2$ some distance behind said separating prism. The proper amount of overlapping of course depends upon the angle between the two faces of the halving prism being rightly adjusted. Of these overlapping images L.O. is an image of the lower half of the objective formed only by light that has passed through the lower half $P_1$ of the halving prism and formed an image thereon while UO is an image of the upper half of the objective formed by light that has also passed through and formed an image on the lower half $P_1$ of the halving prism.

$LO^1$ is an image of the lower half of the objective formed by light which has passed through and formed an image on the upper half $P_2$ of the halving prism; while $UO^1$ is an image of the upper half of the objective formed by light which has passed through and formed an image on the upper half $P_2$ of the halving prism. Two straight edged screens are now so placed above and below in the plane of $O_1$ $O_2$ in which the images of the objective are formed as to cut off the extreme half images LO and $UO^1$ leaving the light passing through UO and $LO^1$ only to pass on through the remaining lenses of the eyepiece system into the eye, with the result that the observer sees on the lower half P1 of the halving prism the images thrown by the upper half of the objective only, the image thrown thereon by the lower half of the objective being eliminated. Similarly the observer sees on the upper half P2 of the halving prism the image thrown by the lower half of the objective only, the image thrown thereon by the upper half of the objective being eliminated. So that in the final field of view as presented to the eye, one half of the image comes from one half of the objective and one end of the instrument only while the other image comes from the other half of the objective and the other end of the instrument only, the two half fields being separated by a sharp line corresponding to the separating ridge of the prism P1—P2.

The pencils of light passing through the two overlapping semicircles UO and $LO^1$ pass through three more lenses before reaching the eye, first an erector lens, whose function it is to project an erected image of the upside down image formed on P1 and P2; 2nd, a field lens and finally an eye lens, and in the air behind the latter is formed a second image M picturing the two halves of the object glass, but UO and $LO^1$ are now right way up compared with the objective.

The chief object of the present invention is to secure a simplification of construction and to this end, it is desired, if possible, to employ an eyepiece of only two lenses instead of four, effecting the erecting of the images by other means than by the employment of the second erector lens.

The lens L is arranged to become the field lens and an eye lens is placed immediately behind it to view the image formed on the halving prism direct. In this case the overlapping images of the objective will be formed behind the eye lens for the first time, but the outlying semicircles LO and $UO^1$ cannot now be cut off by screens without preventing the eye coming close enough to the eye lens to see the whole field of view comfortably. Thus it becomes necessary to cut off the light forming the outlying and unwanted semicircles in some other way.

Fig. 2 is a plan of one arrangement according to this invention, while Fig. 3 is a vertical diagrammatic section of the same.

Here $S_1$ is the left hand optical square consisting of two mirrors $m_1$ and $m_2$ held at an angle of 45° with one another, and receiving light from the distant object through the left hand window $W_1$ of the range finder, while $S_2$ is the right hand optical square receiving light from the distant object through the right hand window $W_2$ the distance apart of said mirrors being the base length of the instrument. Then $r_1$ and $r_2$ are two flat silvered mirrors for doubling the line of sight back parallel to itself. ZP is an achromatic prism which can be swung around a vertical axis and fixed for setting the instrument to correct infinity adjustment while RP is a similar prism which is swung around by a suitable range indicating mechanism about a vertical axis. Or both ZP and RP can be swung simultaneously and equally in opposite or in similar directions about their vertical axis, as shown in Fig. 2. It will be understood however that any desired means may be provided for range finding and for infinity adjustment. When the instrument is set for infinity these prisms are at their positions of minimum deviation and are then about square on to the line of sight or parallel to the windows, but for finite ranges they swing around in the direction of the arrows, so that by the extra deviation which they give, increasing as the square of the angular swing from the minimum deviation position, the separation between the upper and lower images of the distant object is neutralized, upon which the correct range of the said object is read off on a suitable scale.

In the vertical longitudinal section Fig. 3, H is the halving prism, which may be described as a female halving or separating prism, since it is thinnest along the ridge, and not thickest as in the previously described older case of Fig. 1. The halving edge is again placed in the focal plane of the objective. It is preferably made of one piece of glass, as any junction formed between the two thinner ends of two prisms would be prejudicial unless the sloped surfaces of the prism are turned away from the objective. Apart from that however, it is almost impossible to get the two edges of the polished surface of two prisms sharp and really free from minute chips, which look very ragged under the magnifying power of the eyepiece. This prism is also shown in plan or horizontal section at H in Fig. 2. R is a roof prism (shown in cross section in Fig. 2ª) for making the images upright, L is the field lens of the eyepiece while E is the eye lens of the same. The eyepiece projects aerial images of the objective to a point $p$ behind it and these images are duplicated and overlapping owing to the effect of the separating prisms. While explaining the effect of the arrangement we will ignore the erecting prism R and treat the telescope as an inverting one. On this supposition the objective O is receiving light through its upper half from the left optical square S1 and through its lower half from the right optical square S2; the left optical square being fixed upside down with the lower edges of its mirrors level with the center of the objective.

It is clear that two images will be thrown all over the halving prism H, one formed by light from S1 and one from light from S2. One image on the lower half field P1 is formed by light from S1, passing through the upper half of the objective, and behind the eyepiece this forms the image UO (Fig. 3ª) which has to be cut off. The light falling on P1 from the lower half of the objective and S2, subsequently passes through LO. One image on the upper half P2 of the halving prism is formed by light passing from S1 through the upper half of the objective, and then emerging through $UO^1$, and the other image is formed by light passing from S2 through the lower half of the objective and subsequently through the image $LO^1$ of the half objective. $LO^1$ also should be cut off. If not cut off and if the magnifying power of the eyepiece were high enough to allow both $LO^1$ and UO to pass through the pupil of the eye, as it would be for a magnifying power of 50, then the whole field of view would be seen occupied by both images, which would be overlapping images and not split images. If $LO^1$ and UO are cut off then in P1 or the lower half of the field of view, the image from S2 and lower half of the objective only is seen, while in P2 or the upper half of the field of view the image from S1 and the upper half of the objective only is seen. But $LO^1$ and UO must be cut off by other means than by screens fixed at $p$ and I effect this cutting off by fixing longitudinal flat screens $a$—$a$, $a_1$—$a_1$ and $a_2$—$a_2$ (Fig. 3) of either thin blacked metal placed in the horizontal median plane of the telescope and bisecting the objective and cone of rays or else by a still better form of screen yet to be described. This screen should be kept as thin as possible and should become a razor edge where it terminates just short of and level with the halving edge of the halving prism.

It is then quite clear that the upper half of the objective can no longer supply light to the lower half P1 of the halving prism nor can the lower half of the objective supply light to the upper half P2 of the halving prism. Therefore the half images $LO^1$ and UO are not formed at all, being cut off at their source, so that the two overlapping half images $UO^1$ and LO only are received by the observer's eye. Then supposing the reversing prism R is in operation the observer will see in the lower half field the lower half image formed by light reflected from S1 and the left hand end of the instrument and through the upper half of the objective and in the upper half field the upper half image formed by light coming from S2 and the right hand end of the instrument and reflected through the lower half of the objective. Thus the upper image will appear to move more and more to the left hand of the lower image as the range of an object decreases and the more and more will the swinging prism or prisms have to be swung around in order to neutralize the separation and bring the upper and lower images into coincidence again.

As regards the screens, I have found by experiment that sheets of thin metal, however carefully blacked they may be, still appear more or less shiny when the light impinges very obliquely on them, as in a telescope tube, so that a good deal of scattered light is thrown over the field of view, having a prejudicial effect on the clearness of definition. Figs. 4 A, B and C, show another method of construction in which a light thin metal tube is pierced with a straight row of holes along both sides and all lying in one diametral plane. Then a thin black thread, preferably under $\frac{1}{50}$th of an inch thick is threaded to and fro between the two rows of holes and pulled taut. If required a comb like spring of thin sheet steel can be arranged to keep the thread stretched. It is clear that the maximum angle any ray of light in the telescope can make with the axis is represented by the radius of halving prism plus the radius of the objective divided by the focal length of the objective, and for example I will assume an objective of 4 inches aperture or two inches radius and 40 inches focal length and the radius of the halving prism to be .40 inches, then the angle of rays will be $$\frac{2+.4}{40} = .06°,$$ so that a set of cross threads .02 thick must be placed not more than .32 apart in order to effectively screen off all light crossing the horizontal axial plane of the telescope. The piece of tube carrying such a webbing $a_1$—$a_1$ can then be fixed properly between the objective and the reversing elbow prism. But between the latter and the halving prism ($a_2$—$a_2$) and between the nearest optical square S1 and the objective ($a$—$a$) the threads must be stretched across a flat open frame of thin metal such as is shown in Fig. 5 which seen edgewise has the least possible thickness of .02 inch or so, so as not to obstruct light passing from the optical square S2 to the mirror $r_1$ (see Fig. 2). In Fig. 5 F is the flat frame of very thin sheet metal, preferably steel, and $t$—$t$ are the black threads strung to and fro. H is the halving prism and R is the erector prism. The end of the frame next the halving prism should be thinned off to a knife edge stopping just short of the halving edge, and the frame should be capable of being easily lifted out of the way when the erector prism and halving lens are to be cleaned.

In place of the razor edged strip of metal just referred to, a better plan still is to arrange that the last $1\frac{1}{2}$ or 2 inches of the screen up to the halving prism shall be made of much finer wires, say .0025 inch thick and stretched across at closer intervals of .05 in. or so, the last one just touching the plain surface of the halving prism and coincident with the separating edge.

Fig. 6 shows a form of my range finder in which the optical squares are arranged to reflect toward one another and the light therefrom is reflected into the telescope from the crossed half mirrors m3 and m4, placed about the center of the instrument, together with the undivided mirror m5 and thence into the telescope objective O and then through the erecting prism RP toward the female halving prism H and eye lens E. Here it is of advantage to cement an achromatic negative Barlow lens or amplifying lens B to the prism RP to enlarge the image, and so to obtain an image as large as would be thrown by an objective of about 40 inches focal length. This device gives the equivalent of a long focus within the small space that is available if the eye piece is to be kept near the center of the instrument.

It is highly desirable that the female halving prism be made of a single piece of glass, it being obvious that no joint can be present along the line of split; and consequently difficulties of manufacture arise, the finished article tending to show longitudinal streakiness in the grinding and polishing, and further the hollow ridge tends to round off and become indefinite.

In case these disadvantages cannot be quite overcome I also provide according to the present invention, a compound halving prism as shown in section in Fig. 7. The two parts are connected by balsam which fills in any residual irregularities in the female prism F, so that in view of the exact finish, perfect polish, and sharp edge which it is possible to impart to the male prism M, these irregularities are rendered imperceptible.

By way of example the male separating prism M may be of refractive index of say 1.50 balsamed into and fitting the female separating prism F having a refractive index of say 1.60 so that the effective refractive power of the combination is expressed by $(1.6-1.5)\theta$ or $(0.10)\theta$ where $\theta$ is the angle of slope, and the refraction in the direction of the female prism.

As the formula for the simple prism is $(.50)\theta$ it is obvious that the slope must now be five times what it is in the simple case.

The balsam being substantially of equal refractive index to the glass of the female prism becomes as it were continuous with this latter and takes up the form of the perfect male prism.

The field lens can obviously be made out of the same piece of glass as the male prism, as shown in Fig. 7. In Fig. 8 $g^1$ is a flat circular grinder and $g^2$ another behind it both rotating rapidly about the two axes $z^1$ and $z^2$. These being set to make the requisite angle, then the piece of glass P is traversed to and fro under them in a direction perpendicular to the diagram, by means of a screw while the grinders are rotating and grinding the glass away with some fine abrasive. When polishing, the grinders must be faced with pitch or other polishing material. On this principle a female halving prism can be ground and polished with a tolerably fine finish and sharp hollow ridge or angle.

It is obvious that the function of each half of the halving prism when placed in the focal plane of the telescope and supposing an eye is placed immediately behind it and viewing the objective through it is to refract the center point of each utilizable half of the objective down on to the axis. Hence if A is the aperture and F the focal length of the objective then the refraction required for each half of the halving prism is $\frac{A}{4F}$.

For instance an objective of 3.88 aperture and 41.6 focal length requires a refraction of $\frac{.97}{41.6}$ or .0233 in angle. But an allowance should be made for the fact that from the point of view of the halving line the screen of cross threads or the like involves a cutting out of a narrow diametral strip of objective leaving each available half a little short of a semicircle, so that the centers of the same become wider apart. Assuming the unused or wasted strip is .08 in width one formula for angle of deviation becomes $$\frac{.99}{41.6} = .0238.$$

Supposing the female halving prism be made of dense barium crown glass and having $N_D = 1.6048$ and the male prism of fluor crown glass having $N_D = 1.4785$ then the difference between their indices is .1263 and the correct angle of slope for each side is about $$\frac{.0238}{.1263} = .1884 = \tan 10° - 40'.$$

In this case the angle of slope is about as moderate as is possible, but a transparent cement must be used whose refractive index is equal to that of the female prism and gum guaiacum answers to this requirement, having a refractive index of 1.605.

As this gum is generally of too deep a brown color to be used the best way is to break up lumps into small pieces and select the pieces of greatest paleness and transparency and then the lump can be melted and squeezed down between the female and male halving prisms just as in the case of Canada balsam. Even then, however, the prism will not be quite so transparent as if balsamed together. Should Canada balsam be used it should be well hardened to a resin, when its refractive index approaches 1.545. Then for the female halving prism a barium crown or barium light flint glass may be used having a refractive index of 1.5452 while the male halving prism can still be of fluor crown having a refractive index of 1.4785 so that the difference is $$.0667 \text{ and } \frac{.0238}{.0667} = .3568 = \tan 19° 38'$$

the required angle of each half of the prism.

I regard it of great importance to use a cement having a refractive index as nearly as possible equal to that of the female halving prism because then any imperfections of finish or polish in the latter become optically completely obliterated and the prism practically becomes the more perfectly finished male prism but of course operating with a negative refractive index. Indeed it is no longer necessary even to polish the surfaces of the female halving prism and it may be left gray from the smoothing emeries. I have proved that the best way of grinding the surfaces of the female prism is to employ the rotating disk grinders in the manner shown in Fig. 8, using the finest emery and seeing that the disk faces are flat up to their extreme edges and the latter sharp. The grinders must be capable of fine adjustment up and down their respective axis of rotation. If both are equally too low it is obvious that they will leave a little elevated ridge along the junction of the surfaces and if both are too high will leave a sunk channel. If one be higher than the other then there will be a drop or step from one surface to the other along the junction.

The thickness ($t$) of the glass of the female halving prism along the ridge wants to be kept as small as is considered safe, say .035 in. or so, so that that last wire of the screen may lie as close up to the halving edge as possible. There is a relationship between the diameter ($d$) of this wire or thread and its effective air distance from the halving edge.

Assuming the air distance to be $$\frac{t}{N_D} \text{ or } \frac{.035}{1.54} = .023 \text{ plus } .002 = .025 (= D).$$

Then the diameter of the wire should not exceed $$D\frac{(A)}{F} \text{ or } (.025)\left(\frac{1}{10.73}\right)$$

in the case of the 41.6 inch objective of 3.88 aperture or .0023 which subtends an angle of 11½ seconds in the field of the objective. If now the eyepiece be focused, not upon the halving or separating edge itself but on this wire, then the latter will show as a sharply defined black line of 5¾ seconds width, its apparent width being halved by the refractive effect of the halving prism. Should the eyepiece be focused on the halving edge itself then the apparent halving line will shade off a little on either edge and the two images very slightly overlap one another. While in this case the maximum diameter ($d$) of the wire should be $D\frac{A}{F}$, its minimum should be one half of that otherwise there will be a little too much overlapping and crossing of the halving edge by the two images.

The center of the wire must be very accurately level with the halving edge. Should the same gage of wire be employed for the longitudinal screen for a distance of (say) 2 inches from the halving prism then the distance apart center to center must not exceed $(d)\frac{(2F)}{A}$ or in this case $$(.0023)\frac{83.2}{3.88} = (.0023)(21.4) = .049$$

and had better be only .04 in.

The perusal of this specification renders it apparent that the true function performed by the female halving prism is not exactly to separate the left hand and right hand range finder images from one another by a horizontal line separating the upper from the lower field, for it is quite clear that the longitudinal screens alone perform that function very effectively so that if no halving prism were there at all yet the field would appear divided into an upper and lower field by a fairly sharp halving line formed by the last wire next the eye-piece, the upper image coming from one end of the instrument and the lower image from the other end. But if no halving prism were there then a normal image of the object glass would be formed behind the eyepiece and half the pupil of the eye would be filled by light from the upper image and the other half of the pupil by light from the lower image and this is the only condition under which both images would appear of equal brightness, moreover a very slight raising or lowering of the eye would cause a marked inequality in brightness.

The effect of introducing the female halving prism is to cause the two images of the two halves of the objective in actual use to overlap or overlie one another behind the eye-piece so that the pupil can be filled with light simultaneously from both upper and lower images and the luminosity is therefore doubled as compared to what would be seen, were no halving prism employed.

Also if the eye be slightly raised or lowered from the proper position then the brightness of both images will decrease together. The chief function of the female halving prism is that of light saving, and its secondary function to increase the definiteness and sharpness of the halving line by reducing the apparent width of the last wire to about half. If however, for some valid reason or other, the longitudinal screens are left out then the female halving prism will fulfil the still more necessary function of separating out the two images from the two ends of the instrument from one another and supplying a sharp halving line between them, but since two pupillary images of the objective will now be formed in the air behind the eye lens as shown in Fig. 3ª it becomes necessary, especially for the higher powers, to place two sharp straight edged screens in the pupillary images in order to cut off the outlying images $LO^1$ and $UO$, but this has the disadvantage of preventing the eye coming close enough to take in as large a field of view as can otherwise be presented to it.

I declare that what I claim is:—

1. A telemetric instrument comprising in combination an objective, means to project through separate halves thereof, images of a distant object, means to measure the parallactic displacement of said images, an eyelens, and double frusto wedge shaped prisms with their thin ends together and arranged between objective and eyelens, and a wedge shaped prism of a similar emergent angle to the reëntrant angle formed by the said pair of prisms and fitting therein to form overlapping images behind the eyelens.

2. A telemetric instrument comprising in combination an objective, means to project through separate halves thereof, images of a distant object, means to measure the parallactic displacement of said images, an eyelens, and double frusto wedge shaped prisms with their thin ends together and arranged between the objective and the eyelens, and a wedge shaped prism of a similar emergent angle to the reëntrant angle formed by the said pair of prisms and fitting therein and cemented thereto to form overlapping pupillary images behind the eyelens.

3. A telemetric instrument comprising in combination an objective, means to project through separate halves thereof images of a distant object, means to measure the parallactic displacement of said images, an eyelens, and double frusto wedge shaped prisms of refractive index 1.60 with their thin ends together and arranged between the objective and the eyelens, and a wedge shaped prism of refractive index 1.50 of a similar emergent angle to the reëntrant angle formed by the said pair of prisms and fitting therein to form overlapping images behind the eyelens.

4. A telemetric instrument comprising in combination an objective, means to project through separate halves thereof, images of a distant object, means to measure the parallactic displacement of said images, double frusto wedge shaped prisms their thin ends together and arranged between the objective and the eyelens, a wedge shaped prism of a similar emergent angle to the reëntrant angle formed by the said pair of prisms and fitting therein, and a field lens integral with said prism.

5. A telemetric instrument comprising in combination an objective, means to project through separate halves thereof, images of a distant object, means to measure the parallactic displacement of said images, an eyelens and double wedge shaped prisms with coincident apices arranged between the objective and eyelens to cause an overlapping of pupillary images behind the eyelens, and guards in the optic axis of the instrument between the objective and the wedge prism to prevent like illuminating one-half of the wedge shaped prisms from illuminating also the other half.

6. A telemetric instrument comprising in combination a pair of spaced light deflecting elements, an objective, means to project light from each deflecting element through one half only of the objective, means to measure the parallactic displacement of said images, an eyelens, and double wedge shaped prisms with coincident apices arranged between the objective and the eyelens to cause an overlapping of pupillary images behind the eyelens, and guards in the optic axis of the instrument between the objective and the wedge prisms to prevent light illuminating one half of the wedge shaped prism from illuminating also the other half.

7. A telemetric instrument comprising in combination an objective, means to project through separate halves thereof, images of a distant object, means to measure the parallactic displacement of said images, an eyelens, and double wedge shaped prisms with coincident apices arranged between the objective and the eyelens to cause an overlapping of pupillary images behind the eyelens, and guards formed of very fine threads woven to and fro across the optic axis of the instrument between the objective and the wedge prisms to prevent light illuminating one half of the latter from illuminating also the other half.

8. A telemetric instrument comprising in combination an objective, means to project through separate halves thereof images of a distant object, means to measure the parallactic displacement of said images, an eyelens, and double wedge shaped prisms with coincident apices arranged between the objective and the eyelens to cause an overlapping of pupillary images behind the eyelens, and means to erect the image between the objective and the eyelens, and a negative enlarging lens combined with said erecting prism.

9. As an article of manufacture a glass body comprising a pair of solid frusto prisms of one piece of glass of high refractive index placed with thin edges coincident and integral with one another and cemented to a solid triangular prism of lower refractive index having a similar male angle to the reëntrant female angle of said pair.

10. As an article of manufacture a glass body comprising a pair of solid frusto prisms of refractive index 1.60 placed with thin edges coincident and integral with one another and cemented to a solid triangular prism of refractive index 1.50 having a similar male angle to the reëntrant female angle of said pair.

11. As an article of manufacture a glass body comprising a pair of solid frusto prisms placed with thin edges coincident and integral with one another and cemented to a solid triangular prism having a similar male angle to the reëntrant female angle of said pair and a lens integral with said solid triangular prism.

In witness whereof, I have hereunto signed my name this 12th day of July, 1918, in the presence of two subscribing witnesses.

HAROLD DENNIS TAYLOR.

Witnesses:
ALFRED PROCTER.
GEORGE WILLIAM CURRY.